(12) United States Patent
Hu et al.

(10) Patent No.: US 9,454,567 B2
(45) Date of Patent: Sep. 27, 2016

(54) GRAPH DATABASE QUERY HANDLING METHOD AND APPARATUS

(71) Applicant: Fujitsu Limited, Kanagawa (JP)

(72) Inventors: Bo Hu, Cambridgeshire (GB); Nuno Carvalho, London (GB)

(73) Assignee: FUJITSU LIMITED, Kawasaki (JP)

( * ) Notice: Subject to any disclaimer, the term of this patent is extended or adjusted under 35 U.S.C. 154(b) by 227 days.

(21) Appl. No.: 14/229,158

(22) Filed: Mar. 28, 2014

(65) Prior Publication Data

US 2014/0297621 A1    Oct. 2, 2014

(30) Foreign Application Priority Data

Mar. 28, 2013    (EP) ..................... 13161804

(51) Int. Cl.
*G06F 17/30*    (2006.01)

(52) U.S. Cl.
CPC ... *G06F 17/30424* (2013.01); *G06F 17/30436* (2013.01); *G06F 17/30451* (2013.01); *G06F 17/30469* (2013.01); *G06F 17/30545* (2013.01)

(58) Field of Classification Search
CPC .................. G06F 17/30424; G06F 17/30451
See application file for complete search history.

(56) References Cited

U.S. PATENT DOCUMENTS

2013/0262443 A1* 10/2013 Leida ............... G06F 17/30427
                                                                707/722

FOREIGN PATENT DOCUMENTS

CN    201411730    4/2012
KR    10-0902650    6/2009

OTHER PUBLICATIONS

Extended European Search Report dated Mar. 24, 2014 in corresponding European Patent Application No. 1316804.3.
"Database Foundations for Scalable RDF Processing", Hose et al, Reasoning Web 2011, LNCS 6848, 2011, pp. 202-249.
"Querying Distributed RDF Data Sources with SPARQL", Quilitz et al, ESWC 2008, LNCS 5021, 2008, pp. 524-538.
"SPIDER: A System for Scalable, Parallel/Distributed Evaluation of large-scale RDF Data", Choi et al, CIKM'09, Hong Kong, China, Nov. 2009, pp. 2087-2088.
"Heuristics-Based Query Processing for Large RDF Graphs Using Cloud Computing", Husain et al, IEEE Transactions on Knowledge and Data Engineering, vol. 23, No. 9, Sep. 2011, pp. 1312-1327.
"OptARQ: A SPARQL Optimization Approach based on Triple Pattern Selectivity Estimation", Bernstein et al, Technical Report No. ifi-2007.03, Mar. 2007, 19 pp.

* cited by examiner

*Primary Examiner* — Apu Mofiz
*Assistant Examiner* — Cindy Nguyen
(74) *Attorney, Agent, or Firm* — Staas & Halsey LLP

(57) ABSTRACT

A querying method for a database of graph data encoded as triples being stored on storage servers. The method including dividing a query into a plurality of result criteria triple patterns which query results match, each triple pattern element being either: a single value triple pattern element; or a variable value triple pattern element specifying an ID of a variable. The method includes forming one or more sub-queries each having triple patterns having the same single value triple pattern element or specifying the same ID of a variable as a variable value triple pattern element, issuing each formed sub-query to each of the servers, and receiving triples satisfying a sub-query as results from the servers and using the sub-query results in as a response to the query.

11 Claims, 5 Drawing Sheets

GRAPH DATABASE QUERY HANDLING METHOD AND APPARATUS

CROSS-REFERENCE TO RELATED APPLICATIONS

This application claims the benefit of European Application No. 13161804.3, filed Mar. 28, 2013, in the European Intellectual Property Office, the disclosure of which is incorporated herein by reference.

BACKGROUND

1. Field

The present invention lies in the field of data mining and in particular relates to the handling of graph database queries.

2. Description of the Related Art

Performance bottle necks in distributed computing environments include communication network bandwidth and processing capability. When distributing query evaluation of queries such as SPARQL (SPARQL Protocol and RDF Query Language) queries, a significant increase of network traffic is caused by intermediate results being fetched and forwarded to processing servers for joint operation. In complicated query patterns (with multiple joint variables), this can lead to a large number of data being transferred between devices, many of which will not be included in the final query results, and thus represent unnecessary network traffic. Furthermore, processing bottlenecks can be caused by requiring particular processing servers to perform a series of search operations on a large search space.

SUMMARY

Additional aspects and/or advantages will be set forth in part in the description which follows and, in part, will be apparent from the description, or may be learned by practice of the invention.

Embodiments of the present invention include a querying method for a database of graph data encoded as triples, the triples each comprising values of three triple elements and being stored on a plurality of storage servers, the method comprising:

a dividing step comprising dividing a query into a plurality of result criteria, the result criteria comprising a plurality of triple patterns which some or all query results must match, each triple pattern is composed of three triple pattern elements each corresponding to a different one of the three triple elements. Each triple pattern element is either a single value triple pattern element specifying a single value of the corresponding triple element which triples must have to match the triple pattern, or a variable value triple pattern element specifying an ID of a variable, the ID being attributed to values of the corresponding triple elements of triples matching the triple pattern. The method further comprises a sub-query forming step comprising, forming one or more sub-queries each comprising two or more triple patterns having the same single value triple pattern element or specifying the same ID of a variable as a variable value triple pattern element; a sub-query issuing step comprising issuing each formed sub-query to each of the plurality of storage servers; and a query result preparing step comprising receiving triples satisfying at least one formed sub-query as sub-query results from the plurality of storage servers and using the sub-query results to prepare query results as a response to the query.

A triple element refers generically to either subject, object, or predicate. Particular instances of a triple element are referred to as values of triple elements. For example, the three triple elements may be subject, object, and predicate, so that a particular triple has a value of each of subject, object, and predicate. The entity being described may be referred as the subject of the triple, the range of the identified property may be referred to as the object, and the relationship between the range and the entity may be referred to as the predicate. The triples provide for encoding of graph data by characterizing the graph data as a plurality of subject-predicate-object expressions. For example, the subject may denote a Web resource (for example, via a URI), the predicate denote a particular trait, characteristic, or aspect of the resource, and the object denote an instance, range, or example, of that trait, characteristic, or aspect. In other words, a collection of triple statements intrinsically represents directional graph data. The RDF standard defines a formalized structure for such triples, and the triples in embodiments of the present invention may be RDF triples.

The dividing step may comprise a logical analysis of the received query by applying a series of processing rules to the received query to extract the result criteria which triples must satisfy to be included in the query results.

A triple pattern comprises three triple pattern elements, each of which correspond to a triple element. Each triple pattern element is either bound (single value triple pattern element) or unbound (variable value triple pattern element). A variable ID is attributed to unbound triple pattern elements, so that values (instances) of the unbound triple element are attributed the variable ID when the triple pattern results are stored and processed (or when the results of the sub-query to which the triple pattern belongs are stored).

The sub-query forming step provides a mechanism by which to combine triple patterns which are logically linked via one or more triple pattern elements. Copies of the triple patterns are used since any particular triple pattern may appear in more than one sub-query. The logical link between two triple patterns may be the same bound value of a particular (i.e. one of subject or object or predicate) triple pattern element, or a variable ID which appears in both triple patterns (regardless of whether it is as subject, predicate, or object). Triple patterns linked via a variable ID mutually restrict the set of triples which match one another, and thus are interdependent.

The receipt of the sub-query results provides a mechanism to reduce the processing required to find query results. Conventional methods which divide queries into individual triple patterns and then do all of the combining and conflation of results centrally place a heavy processing burden on the device responsible for combining and filtering intermediate results, that is, triples which match a single triple pattern, into query results, which satisfy the criteria set out in the query for inclusion in the query results. Advantageously, by forming and issuing sub-queries in the manner of embodiments of the present invention, some of the processing burden is distributed among the storage servers, and the overall query response time is reduced.

In known procedures for handling queries of distributed triple databases, query evaluation is performed by sending triple patterns to all data nodes as individual triple patterns with no indication of how they are inter-related. Joining and filtering operations are then performed centrally in order to obtain the query results. Inefficiency is caused by the lack of knowledge of inter-relation between triple patterns. Network traffic is high because all triple pattern results are sent across the network. Furthermore, the search space for joint operations (two triple patterns joined by a variable value triple element) is the Cartesian product of all the candidate triples. Therefore, the processing cost is high. Embodiments of the present invention enable filtering to be performed locally to reduce network traffic and sub-query results from the individual storage servers reduce the search space for operations requiring results from two triple patterns to be joined.

The query result preparing step may include a sub-query result gathering step comprising receiving, from any of the storage servers among the plurality of storage servers storing one or more triples satisfying the result criteria of one of the formed sub-queries, a copy of those one or more triples and storing them as sub-query results of the respective sub-queries. Such a step enables the sub-query results to be received and organized.

Optionally, embodiments may be configured to handle queries in which result criteria further comprise one or more filtering conditions each of which define, for one or more particular IDs from among the IDs of variables, a range within which values of the triple element attributed the ID must fall for a triple to be included in the query results; and wherein the sub-query forming step further comprises forming one or more sub-queries each comprising a triple pattern specifying an ID of a variable as a variable value triple pattern element and a filtering condition defining a range for the specified ID.

Advantageously, forming sub-queries which include filtering conditions in addition to triple patterns provides a further opportunity to parallelize the processing, since the storage servers are provided with the information required to filter the results at the storage servers themselves rather than at the device responsible for combining the results from individual storage servers. In addition, by virtue of performing filtering at the storage servers prior to transmitting sub-query results back to the device issuing the sub-query, the amount of traffic being transferred is reduced. The performance of the storage system as a whole is improved by the reduction in network traffic achieved by filtering in a distributed rather than centralized manner.

As an adaptation of the sub-query forming step, when one of the filtering conditions defines the range within which values of the triple element attributed the ID must fall for a triple to be included in the query results with reference to another ID of a variable, the sub-query forming step includes joining the sub-queries for the ID and the another ID into a single sub-query.

It can be appreciated that there is a logical link between triple patterns containing variable IDs which variable IDs are themselves linked by a filtering condition. For example, it may be that a first triple pattern has an unbound object element for which a first variable ID is specified, and a second triple pattern has an unbound subject element for which a second variable ID different from the first variable ID is specified. A filtering condition may specify that values attributed the first variable ID must not be equal to values attributed the second variable ID. Thus, the filtering condition introduces an interdependence of the results of the two triple patterns—the triples matching the first triple pattern depend on the results of the second triple pattern to determine whether the sub-query is satisfied by those triples. Furthermore, it can be appreciated that certain of the triples matching either triple pattern may be excluded from the query results if they do not satisfy the filtering condition of the sub-query. Hence there is no need to transmit those certain triples to the device combining results, and overall network traffic is reduced.

As a further optional phase, the sub-query forming step may comprise, for each single value triple pattern element or ID of a variable appearing in more than one result criterion, forming a sub-query comprising a copy of every result criterion having that single value triple pattern element or ID of a variable.

The overall performance of the method is made more efficient by reducing the number of sub-queries whilst ensuring that the logical links between result criteria combined into single sub-queries are maintained. It can be appreciated that reducing the number of sub-queries will reduce network traffic and scanning at the storage servers. Therefore, forming the sub-queries by combining all of the result criteria linked by a particular common variable ID or common single value of a particular triple (and if two variable IDs are combined in a filtering condition combining every triple pattern having either variable ID into a single sub-query) maximizes the performance benefits of invention embodiments.

The query result preparing step may further comprise, for each of the formed sub-queries which comprise two or more triple patterns having the same ID of a variable as a variable value triple pattern element: receiving from each of the storage servers individual triple pattern results comprising a copy of every triple satisfying at least one of the two or more triple patterns; removing from the received individual triple pattern results the copies of the triples stored as sub-query results for that sub-query; and searching the remaining received individual triple pattern results for triples satisfying the result criteria of the sub-query, and storing those triples as sub-query results.

It may be that there are query results which satisfy either of the triple patterns of a sub-query but it is not possible to determine whether a filtering condition forming part of the same sub-query is satisfied or not without searching the triples matching either of the triple patterns from the other storage servers. In such cases, the above additional phases of the sub-query result gathering step provide a mechanism for integrating the triple pattern results into sub-query results in an efficient manner. Embodiments of the present invention enable the search space to be reduced by removing triples which it is already known satisfy the sub-query based on the triples matching the triple patterns from a single storage server.

Methods embodying the present invention may be performed on a range of system architectures, as long as the storage of triples encoding the graph database is distributed among a plurality of storage units. The centralized database controller is a logical entity which may be realized as a single device or may be provided as a function of more than one device in cooperation. Optionally, the dividing step, sub-query forming step, sub-query issuing step and sub-query result gathering step are performed at a centralized database controller. The functions performed by the centralized database controller may be performed in a serial fashion, whereas the sub-queries issued to the storage servers can be handled by the plurality of storage servers in parallel.

In terms of processing that is parallelized by being assigned to the storage servers, embodiments may include, at each storage server, receiving the formed sub-queries, scanning the triples stored on the storage server for triples satisfying the result criteria of each of the received sub-queries, and for each received sub-query, transferring a copy of any triple satisfying the result criteria of the sub-query to the other storage servers and/or the centralized database controller as a sub-query result of the sub-query.

The plurality of storage servers are distributed insofar as they each have their own storage management function configured to scan the triples stored thereon, and to combine results of individual result criteria into a sub-query result. Therefore, by issuing sub-queries to the storage servers some measure of parallelization is achieved. The sub-query results may be transferred in a manner in which they are attributable to a particular sub-query.

The process of scanning may include identifying each different triple pattern from among the received formed sub-queries; prioritizing the identified different triple patterns with triple patterns having more variable value triple pattern elements being prioritized below triple patterns having fewer variable value triple pattern elements; in order of priority, for each of the triple patterns, scanning the triples stored on the storage server for triples matching the triple pattern to obtain an intermediate result set of triples; obtaining sub-query results by combining the intermediate result set of triples for each of the triple patterns in sub-queries having more than one triple pattern, and by applying filtering conditions to the intermediate result set of triples for each of the triple patterns in sub-queries having filtering conditions.

Advantageously, performance benefits can be improved by prioritizing triple patterns expected to have fewer results so that triples matching those patterns are found first. Further logical operations which are to be performed on the triples can thus be commenced sooner whilst scanning for triples matching the triple patterns expected to generate more results (and hence take longer to perform and assemble results from) is underway.

In addition to prioritizing on the basis of the number of bound triple pattern elements, it may be that certain other triple pattern elements expected to generate a large number of results cause the triple pattern having those triple pattern elements to be given a lower priority than other triple patterns with the same number of bound (single value) triple pattern elements. For example, triple patterns having triple pattern elements corresponding to the triple elements subject or object, and which contain "RDF" or "RDFS" as a prefix may be given a low priority. Within those, triple pattern elements corresponding to the triple element predicate may be prioritized so that higher priority is given to the predicate "rdfs:subclassof" than is given to "rdfs:label" than is given to "rdf:type". These further rules provide a mechanism for identifying triple pattern elements which could give rise to a triple pattern returning a large number of matches and hence taking a long time to scan, and relegating them to be low priority.

Embodiments may further comprise transferring the intermediate result set of triples for each triple pattern to the centralized database controller for integrating, or to one or more other storage servers assigned to integrate the results of the triple pattern by the centralized database controller.

In particular, methods embodying the invention may further comprise at each of the storage servers, for a sub-query comprising two or more triple patterns specifying the same ID of a variable as a variable value triple pattern element, assigning one of the two or more triple patterns as a first triple pattern and obtaining the intermediate result set of triples for each of the one or more other triple patterns in the sub-query from each of the other storage servers, and, for each of triples found to match the first triple pattern on the storage server, scanning the obtained intermediate result sets of triples to identify pairs or groups of triples satisfying the sub-query.

In such methods, a mechanism may be implemented to ensure that the triple pattern assigned as the first triple pattern is the same on each storage server (which may be achieved by applying the same selection rules, or by cooperating with one another across the network). For example, it may be advantageous to identify the triple pattern from among the two or more triple patterns having the most results (either by aggregating results across the plurality of storage servers or by one storage server acting as a decision-maker and selecting the triple pattern having the most matches on that storage server) in order to reduce network traffic (since the non-first triple pattern results are transferred to the other storage servers).

Advantageously, the transfer of triple pattern results for integration locally at the storage servers parallelizes the integration processing and thus reduces bottlenecks which may occur in a centralized process.

In embodiments of the present invention, the query may be a SPARQL query. SPARQL queries are optimized for querying graph databases and known techniques can be applied to extract individual triple patterns and result criteria from a SPARQL query. An apparatus embodying the present invention may comprise a SPARQL interface for receiving SPARQL queries and returning query results.

Embodiments of another aspect of the present invention include a database controller for a database of graph data encoded as triples, the triples each comprising values of three triple elements and being stored on a plurality of storage servers, the database controller comprising: a query dividing module configured to divide a query into a plurality of result criteria, the result criteria comprising a plurality of triple patterns which query results must match, each triple pattern being composed of three triple pattern elements each corresponding to a different one of the three triple elements. Each triple pattern element is either a single value triple pattern element specifying a single value of the corresponding triple element which triples must have to match the triple pattern; or a variable value triple pattern element specifying an ID of a variable, the ID being attributed to values of the corresponding triple elements of triples matching the triple pattern. The database controller further comprises a sub-query forming module configured to form one or more sub-queries each comprising two or more triple patterns having the same single value triple pattern element or specifying the same ID of a variable as a variable value triple pattern element; a sub-query issuing module configured to issue each formed sub-query to each of the plurality of storage servers; and a query result preparing module configured to receive triples satisfying at least one formed sub-query as sub-query results from the plurality of storage servers and use the sub-query results to prepare query results as a response to the query.

The query result preparing module may comprise a sub-query result gathering module configured to receive, from any of the storage servers among the plurality of storage servers storing one or more triples satisfying the result criteria of one of the formed sub-queries, a copy of those one or more triples and storing them as sub-query results of the respective sub-queries.

Embodiments of another aspect of the present invention include a data storage system comprising a database controller embodying the present invention and a plurality of storage servers storing the triples.

Embodiments of another aspect of the present invention include a computer program which, when executed by one or more computing apparatuses, causes the one or more computing apparatuses to perform a method embodying the present invention.

Embodiments of another aspect of the present invention include a computer program or suite of computer programs which, when executed by one or more computing apparatuses, causes the one or more computing apparatuses to function as a database controller or data storage system embodying the present invention.

The sub-queries of invention embodiments reflect the internal structure of the query. The sub-queries include triple patterns and filtering conditions which are passed to storage servers as a related group so that the sub-query as a whole may be assessed on each storage server locally and a set of triples satisfying the sub-query obtained and made available to other devices. Furthermore, the processing involved in joining results of triple patterns from separate storage servers may be parallelized to improve performance. As a general rule, the more processing that is performed locally in a parallelized fashion, the more the network traffic is reduced and the more processing bottlenecks can be reduced/avoided.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
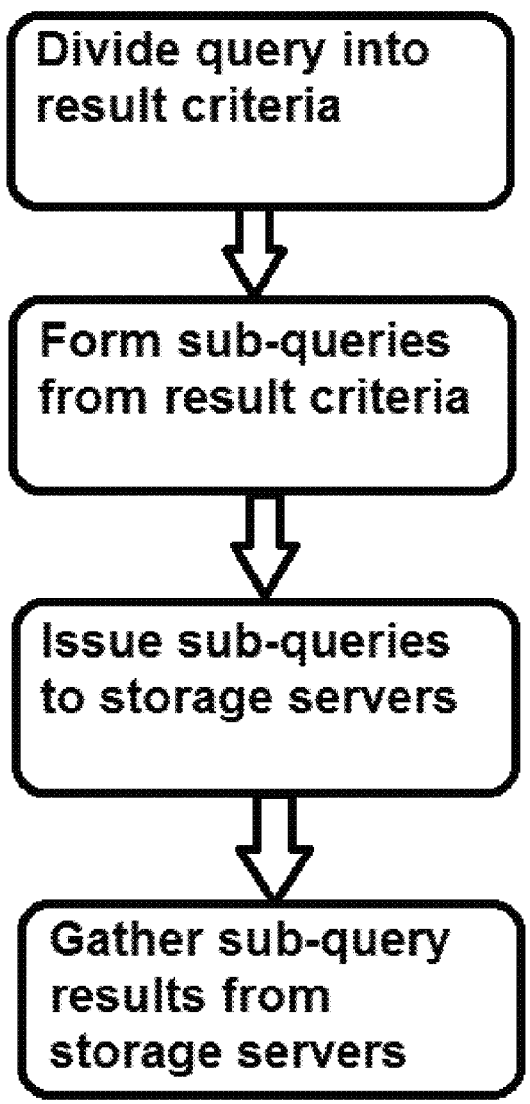
FIG. 1 illustrates a flow chart of method steps in a method embodying the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a flow chart of method steps in a method embodying the present invention. The method embodying the present invention may be, for example, a computer-implemented method. Step S1 may be performed by a dedicated functional module of a database controller, for example, a query dividing module.

Step S1, dividing a query into result criteria, may include dividing the query into result criteria comprising a plurality of triple patterns which some or all query results must match, each triple pattern being composed of three triple pattern elements each corresponding to a different one of the three triple elements. Each triple pattern element is one of a single value triple pattern element specifying a single value of the corresponding triple element which triples must have to match the triple pattern; and a variable value triple pattern element specifying an ID of a variable, the ID being attributed to values of the corresponding triple elements of triples matching the triple pattern.

The processing rules and associated functionality required to divide a graph database query into individual triple patterns and other result criteria is established. For example, the query may be a SPARQL query for which SPARQL query engines exist for dividing the query into individual result criteria.

In addition to triple patterns, result criteria may comprise filtering conditions, which limit the values which values attributed a particular variable ID can take. The filtering condition may limit the values with reference to an absolute value or values, or with reference to values attributed another variable ID.

It may be that the individual triple patterns are connected in the query by an 'OR' type logical statement, in which case only some but not all of the query results will need to match the individual triple patterns. That is to say, it is not necessarily the case that all of the query results need to satisfy all of the result criteria to be included in the query results. Hence the triple patterns each define a pattern which some or all of the query results must match. In combining results according to the query the logic determining how to combine sub-query results is extracted from the query and applied to the sub-query results.

Step S2, forming sub-queries from result criteria, may be performed by a dedicated functional module of a database controller, for example, a sub-query forming module. At step S2, sub-queries are formed from the result criteria. Each sub-query comprises at least two result criteria which could either be triple patterns, or a combination of triple patterns and filtering conditions. The result criteria combined into a particular sub-query are logically linked either by binding a particular triple element to be the same value, or by relating to the same variable ID (either as two triple patterns linked by a common variable ID, or as a triple pattern specifying a variable ID and a filtering condition limiting values attributed that variable ID). Optionally, where a sub-query includes a filtering condition which limits the values attributed one variable ID by reference to results of another variable ID, triple patterns and other limiting conditions including or relating to each of the one variable ID and the another variable ID are included in a single sub-query. Any single result criteria may appear in more than one sub-query, and hence the sub-queries can be considered to be composed of copies of result criteria. In reality of course, a result criteria may be realized as a string or other object type on a computer memory, which in the course of normal processing operations will be read and written from one part of the memory to another and to and from processing components and hence the distinction between being the result criterion itself or a copy of the result criterion is immaterial.

Step S3, issuing the sub-queries to the storage servers, may be performed by a dedicated functional module of a database controller, for example, a sub-query forming module. Step S3 may include issuing each formed sub-query to each of the plurality of storage servers. Issuing a sub-query to a storage server may comprise simply sending a copy or version of the sub-query to the storage server. Optionally, issuing the sub-query may further comprise information on how to structure the sub-query results and whether or not triples matching individual triple patterns within the sub-query are required in addition to the sub-query results. It may be that the sub-query must be presented in a predetermined format in order to be accepted and processed by the storage servers. In such examples, the step of issuing the sub-queries to the storage servers may include formatting the sub-queries into the format required by each of the storage servers. The sub-queries may be issued with an address representing where triples satisfying the sub-query are to be written.

Upon receiving the sub-queries, the storage servers are each configured to scan the portion of the triples encoding the graph database stored thereon for sub-query results. It may be that the storage servers are configured to identify the individual triple patterns within a plurality of received sub-queries, and to scan the stored triples for results matching each of the individual triple patterns, before combining the triple pattern results into sub-query results in accordance with the logic of the sub-queries. In so doing, the storage server ensures that it does not need to scan for triples matching the same triple pattern twice in responding to sub-queries formed from a single query.

The storage servers are configured to transmit copies of triples satisfying a sub-query back to the apparatus/functional module which issued the sub-query, or to an address specified in information included in or with the sub-query.

At step S4 the sub-query results are gathered from the storage servers. Gathering the sub-query results may include receiving the sub-query results from the storage servers or reading the sub-query results from an address to which the storage servers were instructed to write the sub-query results. It may be that the sub-queries are such that the sub-query results from individual storage servers can simply be aggregated to obtain an exhaustive set of results to each of the sub-queries, which can then be combined in accordance with the logic defined by the query. Alternatively, it may be that the sub-query results from individual storage servers represent a partial set of results to a sub-query, and that integration of intermediate results to the individual triple patterns composing the sub-query is required to obtain an exhaustive set of results to the sub-query. In such cases, the sub-query results from the individual storage servers can be used to reduce the search space in the process of integrating the intermediate results.

Figure 2:
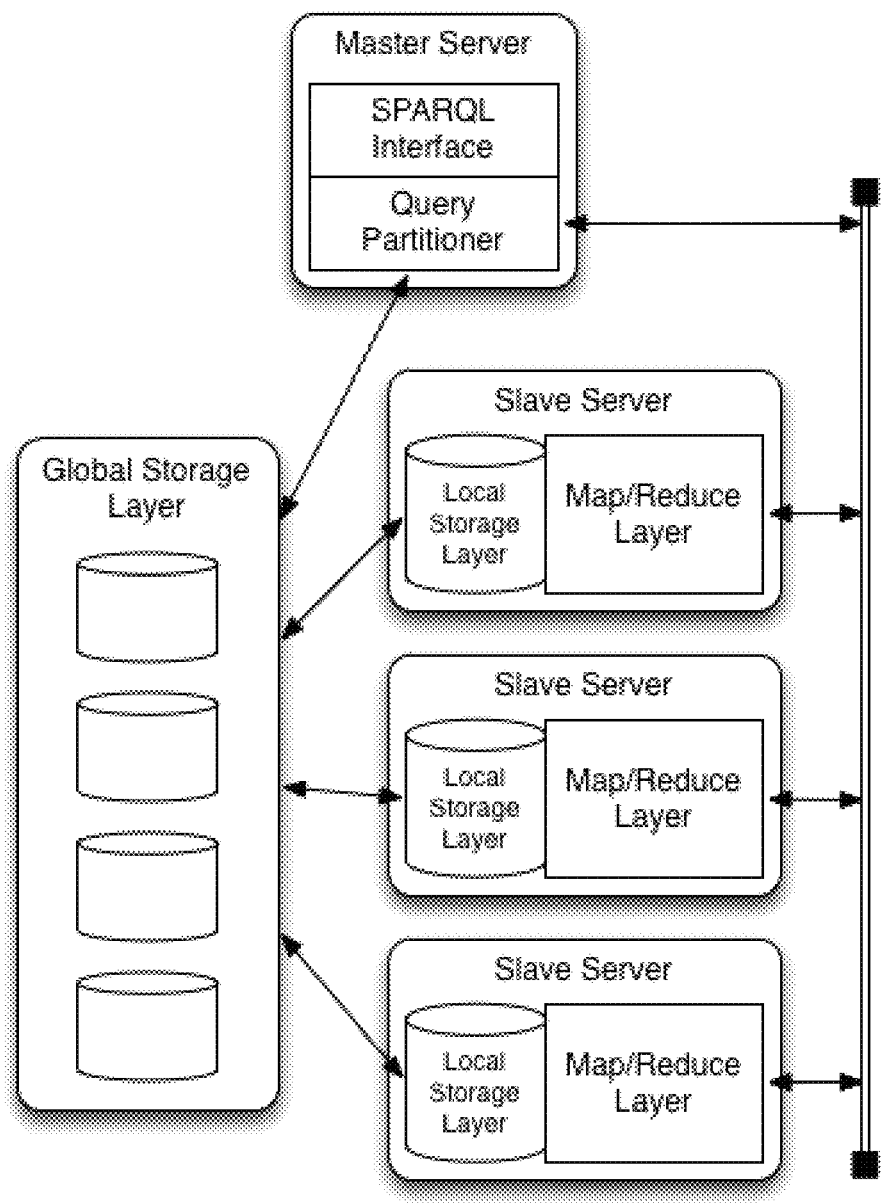
FIG. 2 illustrates an exemplary system architecture of an invention embodiment.

The logical architecture of a system embodying the present invention is depicted in FIG. 2. The proposed system includes three main logical components: a logical global storage layer 20, a set of slave servers 30 and a logically centralized master server 10. The global storage server 20 and centralized master server 10 are logical in the sense that they may be realized by components distributed among physical machines interconnected through a network, depending on scalability needs. The global storage layer 20, for example, may be realized by a dedicated storage section within each of the slave servers 30, and/or a storage section on the master server 10, and/or a dedicated separate storage device.

The master server 10 is exemplary of a centralized database controller. The master server 10 may or may not also function as a storage server. Functional modules of the master server 10 include a SPARQL interface 12 and a query partitioner 14. The SPARQL interface 12 is configured to receive queries from applications. The query partitioner 14 is exemplary of a module combining the query dividing module, the sub-query forming module, the sub-query issuing module, and/or the query result preparing module.

The slave servers 30 are exemplary of storage servers and each comprise a map/reduce layer 34 configured to coordinate scans on the stored triples and to apply logical processing operations to scan results. Intermediate results, that is, triples satisfying a sub-query or partially satisfying a sub-query received at the slave server 30 are stored on the local storage layer 32. In addition, the slave servers 30 include storage units upon which a portion of the triples in the database are stored.

The global storage layer 20 is a storage layer which may be logically considered to be between the slave servers 30 and the master server 10, since each are able to read/write to/from the global storage layer and hence it serves as a mechanism for the exchange of data. Of course, it may be that additional hardware beyond the master server 10 and slave servers 30 and their interconnections is required to realize the global storage layer 20, and the global storage layer 20 merely comprises storage locations on those devices which are accessible to one another. Alternatively, it may be that a dedicated storage unit or storage location, whether it be on the master server 10, a slave server 30, or on a different device altogether, is provided as the global storage layer 20.

Applications accessing the stored triples send SPARQL queries to the master server 10. The master server 10 parses the SPARQL query at the SPARQL interface 12, and at the query partitioner 14 partitions the query into triple patterns and filtering conditions which are then combined to form sub-queries that can be processed separately. The sub-queries are then issued to the slave servers 30.

Slave servers will then process the sub-queries and store intermediate results in the local storage layer 32. Each instance of the local storage layer 32 can be made globally visible by means of a global storage layer 20 which enables slave servers and the master server to read triples stored in the local storage layers.

The function of the query partitioner 14 will now be described in more detail. The query partitioner 14, and specifically a query dividing module thereof, is configured to receive a query such as a SPARQL query and to divide the query into individual triple patterns. Processing rules and procedures for dividing a query such as a SPARQL query into individual triple patterns are available. A triple pattern defines a form of triple which is required to provide a response to the query. A triple pattern includes a mixture of bound triple elements, which are given a single fixed value, and variable triple elements, which are denoted by a variable ID to be attributed to instances of the triple element.

In the following example, individual triple patterns are combined into a query pattern graph (QPG) prior to being formed into sub-queries. The QPG is a conceptual tool representing how the different individual triple patterns are related to one another. Embodiments of the present invention may or may not form an actual QPG from the individual triple patterns. However, it is a useful mechanism for illustrating the logical rules underlying how embodiments of the present invention form sub-queries from individual triple patterns.

In general, triple query patterns can be considered as a graph with each triple pattern as a vertex and shared variables or shared bound values between triple patterns as edges. Embodiments may divide the query into individual triple patterns in a way which includes assigning a triple pattern ID to each individual triple pattern.

As a first example, consider a query comprising the following three individual triple patterns, where each pattern is assigned a pattern ID (i.e. tp1, tp2, tp3):

tp1: (?x, p1, ?y)
tp2: (s1, p2, ?z)
tp3: (?x, p2, ?z)

Figure 3:
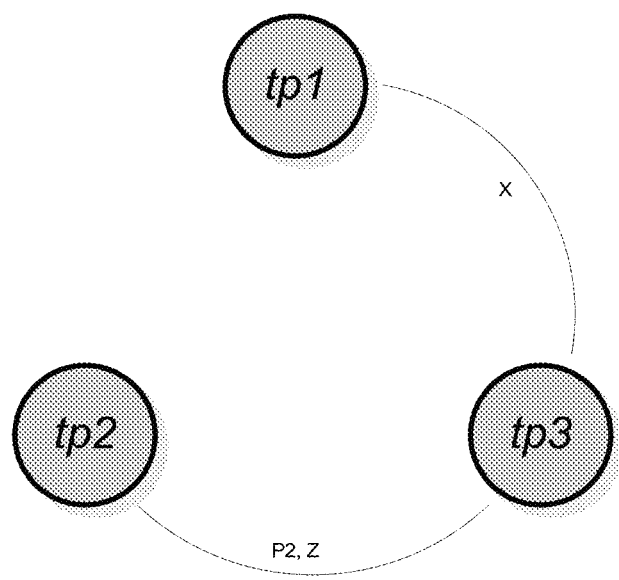
FIG. 3 illustrates a first example of a query pattern graph.

A QPG of the triple patterns tp1, tp2, tp3 is illustrated in FIG. 3. Edges of the QPG are labeled with the names of shared variables or common bound values. For the avoidance of doubt, we note that "?" represents a variable value triple pattern element, and the character following the "?" represents an ID of the variable value triple pattern element. Bound values are represented by single value triple pattern elements denoted by s/p/o to indicate whether the bound value is a subject/predicate/object, and the numeral following the s/p/o represents a particular value, that is, a particular instance of s/p/o. In the example given, triples are represented by string objects, so that "s1" is a string object, in particular, it is an example of a subject. In the particular example, two bound values having the same value but relating to a different triple element are not deemed equal or common. That is to say, if s1 and p2 are the same string, they are not deemed to be a bound value which is shared by two triple patterns, because they do not represent the same one of the three triple pattern elements s/p/o.

As illustrated in FIG. 3, the QPG has three nodes: tp1, tp2, and tp3. tp1 is connected to tp3 by an arc denoted "x", because the variable ID "x" appears in both tp1 and tp3. tp3 is connected to tp2 by two arcs (or by an arc having two labels), one labeled "p2", because tp2 and tp3 both have the same bound value of the predicate triple element, and one labeled "z", because the variable ID "z" appears in both tp2 and tp3.

Sub-queries are then formed by the query partitioner 14, for example, by a sub-query forming module belonging to the query partitioner 14. Conceptually, the sub-queries may be considered to be formed by partitioning the QPG. Of course, in an embodiment sub-queries may be formed by building and then partitioning a QPG, or simply by combining result criteria using rules, which rules may be considered to derive from the QPG concept.

Figure 5:
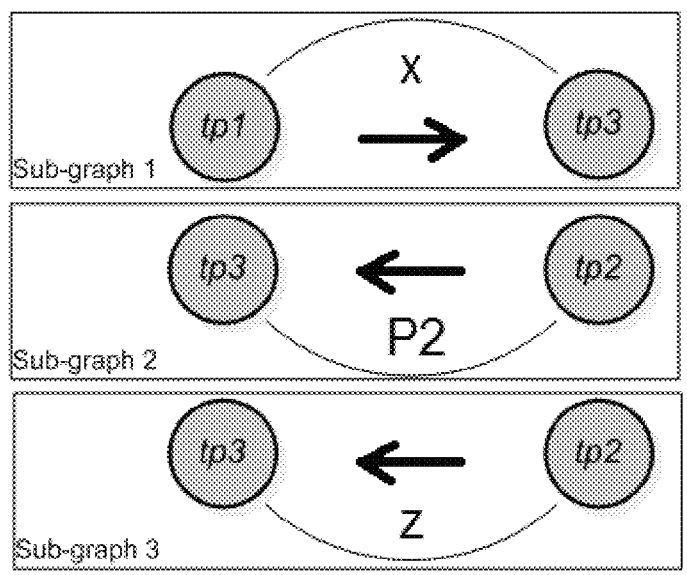
FIG. 5 illustrates sub-queries corresponding to the first example.

The sub-queries may be formed using the following sub-query forming rules, noting that a single triple pattern may be copied into more than one sub-query. Firstly, vertices are grouped by edge, so that all vertices linked by a particular edge label are grouped together. Secondly, when an edge connecting two vertices is annotated with multiple labels, duplicate the vertices (the triple pattern) into separate sub-queries unless they are connected by the same filter. Finally, vertices at the boundary are duplicated if required to separate one sub-query from another, unless the edge labels of the two sub-queries sharing the boundary are connected by the same filter. FIG. 5 illustrates the three sub-queries formed by applying the above rules to the triple patterns tp1, tp2, tp3.

In FIG. 5, the arcs indicate edges joining two triple patterns into a sub-query. The arrows indicate the order of priority between the two triple patterns. In the particular example, tp2 has more bound triple pattern elements and is therefore afforded a higher priority than either of tp1 or tp3. In fact, each of tp1 and tp3 have only one bound triple pattern element. Slave servers 30 may be configured to break ties in a number of ways, some of which are mentioned elsewhere in this document. Ties may also be broken in an apparently arbitrary fashion, for example, by alphanumeric order of the triple pattern id or of a string formed by concatenating the triple pattern elements of the triple patterns. The slave servers may all be configured to use the same procedure to break ties so that they each scan the triple patterns in the same order.

When the query includes filtering conditions, the filtering conditions are extracted from the query by the dividing module and treated in a similar way to the triple patterns. Triple patterns and filtering conditions can collectively be referred to as result criteria. When filtering conditions are included in the query, each filtering condition is included as a vertex in the QPG and connected to other vertices based on the variable ID attributed to the variable values being filtered. Therefore, filtering conditions are deemed to be treated in the same way as triple patterns.

As an alternative to the first example of a query, consider a query divided into result criteria including a mixture of triple patterns and filtering conditions, for example:
tp4: (?x, p1, o1)
tp5: (?y, p2, o2)
F1: (?x≠?y)
A QPG constructed using the result criteria of the alternative example is illustrated in FIG. 4.

Figure 4:
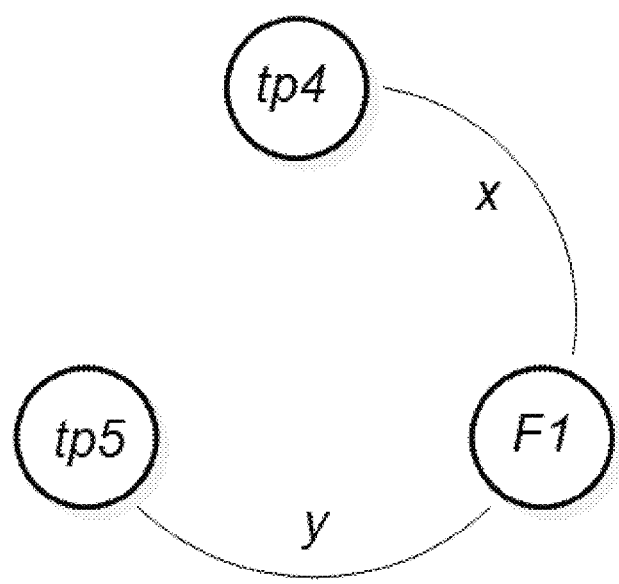
FIG. 4 illustrates an alternative example of a query pattern graph.

Applying the sub-query forming rules to the alternative example, the formed sub-query is actually identical to FIG. 4, because the filter connects edges "x" and "y" by filtering "x" with respect to "y", or vice versa.

The sub-queries are then issued to the slave servers 30, for example, by a sun-query issuing module, for processing by the slave servers.

It may be that the slave servers 30, which are exemplary of storage servers, receive a number of sub-queries, and identify the different individual result criteria from the collective sub-queries queries to prevent duplicating scans and processing and to enable some prioritization. For example, the prioritization may be on the basis of the number of triples expected to result, so that triple patterns expected to return more triples are processed (scanned for results on the storage part of the slave server) after those expected to return fewer triples. In that way, the additional processing of the sub-queries having fewer results is not delayed. In addition, the processing required to apply filtering conditions may be prioritized.

The following is an exemplary set of rules for prioritizing result criteria:

Select triple patterns with more bound triple elements (being subject, predicate, object)

Filtering conditions should have lower priority than the triple patterns appearing in the same sub-query. Filters with fewer variables have higher priority than those have more variables, since they are quicker to process.

Break ties by selecting other subject and object over rdf:xxx/rdfs:xxx (i.e. any properties prefixed by RDF/RDFS namespace—these are expected to return a large number of triples and hence are moved down the priority)

Break ties by selecting other types of predicates over rdf:xxx/rdfs:xxx rdf:xxx predicates are priorities in the following order: rdfs:subclassof>rdfs:label>rdf:type (this provides a further means by which to discriminate between triple patterns expected to return a large number of results, and those which are not).

The receipt of sub-queries and prioritisation of result criteria is performed by each slave server, for example, by the map/reduce layer 34. Once the prioritisation has been performed, the triple pattern with the highest priority is scanned, and so on. Alternatively, the triple patterns may be scanned in any order. Scanning a triple pattern includes scanning the triples stored on a slave server for triples matching the triple pattern and storing copies of the triples matching the triple pattern as an intermediate result set of triples. Each slave server scans the portion of the triples in the database which are stored on that slave server.

Once the slave servers have the intermediate set of triples for each triple pattern, further processing is performed on a per triple pattern basis to identify, for each sub-query, a set of triples which match all of the result criteria in the sub-query and are hence considered sub-query results. The sub-query results are transferred to the database controller, such as the master server and/or to the fellow slave servers, for example, by writing the sub-query results to the global storage layer 20.

In some cases, it may be that the sub-query cannot be assessed on a purely local basis, that is to say, some knowledge of the triples matching a triple pattern from the sub-query and stored on other slave servers is required. In such cases, the triple pattern matches from the individual slave servers are written to the global storage layer or otherwise made available to the other slave servers. Each slave server is then configured to search the global results (the aggregation of the triples matching the triple pattern across the distributed network) to find sub-query results. It may be that the search space is reduced by excluding triples which are already identified as sub-query results, for example, as a result of the previous local processing. Furthermore, some assignment of responsibility between slave servers may be performed, for example, by the centralised database controller, so that processing work is not duplicated among slave servers.

To illustrate such cases, consider the following example:
tp6: (?x, p1, ?y)
tp7: (?y, p2, ?z)

tp6 and tp7 are linked by the variable ID "y", and hence are formed into a sub-query. When the sub-query is sent to the slave servers, either tp6 or tp7 will be scanned first. Hence, an intermediate set of results for ?y is produces. Once the second of tp6 and tp7 is scanned, the list of results for ?y and hence ?x and ?z is partially instantiated. However, none of the results of tp6 or tp7 can be excluded from a list of potential triples satisfying the entire sub-query without knowledge of triples matching tp6 and tp7 stored on other slave servers. Thus, the partial instantiation of ?x and ?z reduces the search space of further integration operations, but the triples matching tp6 and tp7 are made available to other slave servers so that ?x and ?z can be fully instantiated, and the triples having those instances returned as sub-query results.

Once results of the individual sub-queries have been assembled, the individual sub-query results can be processed to produce a set of query results, according to the logic determined by the form of the query itself. For example, it may be that the query was structured in such a way that a triple matching any of the sub-queries satisfies the query and is included in the query results. Alternatively, it may be that additional joining of sub-query results or filtering is required in order to find the query results. The logic determining the combination of sub-query results into query results is defined by the query itself, and hence the master server 10, or a query planning, query handling or query executing module or process thereof has the functionality to determine the logical processing necessary to combine the obtained sub-query results into query results. Preparing the query results may be performed by a centralised function such as a database controller or master server, or may be performed by one or more of the slave servers operating in parallel.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

Although a few embodiments have been shown and described, it would be appreciated by those skilled in the art that changes may be made in these embodiments without departing from the principles and spirit of the invention, the scope of which is defined in the claims and their equivalents.

The invention claimed is:

1. A querying method for a database of graph data encoded as triples, the triples each comprising values of three triple elements and being stored on a plurality of storage servers, the method comprising:

at a centralized database controller, a dividing step comprising dividing a query into a plurality of result criteria, the result criteria being a triple pattern which some or all query results must match, each triple pattern is composed of three triple pattern elements each corresponding to a different one of the three triple elements;

each triple pattern element being either one of:

a single value triple pattern element specifying a single value of the corresponding triple element which triples must have to match the triple pattern; or a variable value triple pattern element specifying an ID of a variable, the ID being attributed to values of the corresponding triple elements of triples matching the triple pattern;

at the centralized database controller, a sub-query forming step comprising, forming one or more sub-queries each comprising two or more triple patterns having the same single value triple pattern element or specifying the same ID of a variable as a variable value triple pattern element;

at the centralized database controller, a sub-query issuing step comprising issuing each formed sub-query to each of the plurality of storage servers;

at each storage server:

receiving the formed sub-queries, scanning the triples stored on the storage server for triples satisfying the result criteria of each of the received sub-queries, and, for each received sub-query, transferring a copy of any triple satisfying the result criteria of the sub-query to the other storage servers and/or the centralized database controller as a sub-query result of the sub-query, wherein the scanning comprises:

identifying each different triple pattern from among the received formed sub queries;

prioritizing the identified different triple patterns with triple patterns having more variable value triple pattern elements being prioritized below triple patterns having fewer variable value triple pattern elements;

in order of priority, for each of the triple patterns, scanning the triples stored on the storage server for triples matching the triple pattern to obtain an intermediate result set of triples; and obtaining sub-query results by combining the intermediate result set of triples for each of the triple patterns in sub-queries having more than one triple pattern, and by applying filtering conditions to the intermediate result set of triples for each of the triple patterns in sub-queries having filtering conditions;

the method further comprising:

at the centralized database controller, a query result preparing step comprising receiving the sub-query results from the plurality of storage servers and using the sub-query results to prepare query results as a response to the query.

2. A method according to claim 1, wherein result criteria further comprise one or more filtering conditions each of which define, for one or more particular IDs from among the IDs of variables, a range within which values of the triple element attributed the ID must fall for a triple to be included in the query results; and the sub-query forming step further comprises forming one or more sub-queries each comprising a triple pattern specifying an ID of a variable as a variable value triple pattern element and a filtering condition defining a range for the specified ID.

3. A method according to claim 2, the sub-query forming step further comprising, when one of the filtering conditions defines the range within which values of the triple element attributed the ID must fall for a triple to be included in the query results with reference to another ID of a variable, joining the sub-queries for the ID and the another ID into a single sub-query.

4. A method according to claim 1, wherein the sub-query forming step comprises, for each single value triple pattern element or ID of a variable appearing in more than one result criterion, forming a sub-query comprising a copy of every result criterion having that single value triple pattern element or ID of a variable.

5. A method according to claim 1, wherein the query result preparing step further comprises, for each of the formed sub-queries which comprise two or more triple patterns having the same ID of a variable as a variable value triple pattern element:
receiving from each of the storage servers individual triple pattern results comprising a copy of every triple satisfying at least one of the two or more triple patterns;
removing from the received individual triple pattern results the copies of the triples stored as sub-query results for that sub-query; and
searching the remaining received individual triple pattern results for triples satisfying the result criteria of the sub-query, and storing those triples as sub-query results.

6. A method according to claim 1, further comprising at each of the storage servers, for a sub-query comprising two or more triple patterns specifying the same ID of a variable as a variable value triple pattern element, assigning one of the two or more triple patterns as a first triple pattern and obtaining the intermediate result set of triples for each of the one or more other triple patterns in the sub-query from each of the other storage servers, and, for each of triples found to match the first triple pattern on the storage server, scanning the obtained intermediate result sets of triples to identify pairs or groups of triples satisfying the sub-query.

7. A method according to claim 1, wherein:
the query result preparing step includes obtaining the query results by combining the sub-query results of each of the sub-queries according to the query.

8. A method according to claim 1, wherein the query is a SPARQL query (SPARQL Protocol and RDF Query Language).

9. A non-transitory computer readable storage medium storing a computer program which, when executed by one or more computing apparatuses, causes the one or more computing apparatuses to perform the method according to any of claim 1.

10. A system comprising a database controller for a database of graph data encoded as triples, and a plurality of storage servers for storing the database, the triples each comprising values of three triple elements and being stored on the plurality of storage servers, the database controller comprising:

a processor; and
a memory which stores a plurality of instructions, which when executed by the processor, cause the processor to execute,
dividing a query into a plurality of result criteria, the result criteria comprising a plurality of triple patterns which query results must match, each triple pattern being composed of three triple pattern elements each corresponding to a different one of the three triple elements;
each triple pattern element being either one of:
a single value triple pattern element specifying a single value of the corresponding triple element which triples must have to match the triple pattern; and
a variable value triple pattern element specifying an ID of a variable, the ID being attributed to values of the corresponding triple elements of triples matching the triple pattern
forming one or more sub-queries each comprising two or more triple patterns having the same single value triple pattern element or specifying the same ID of a variable as a variable value triple pattern element; and
issuing each formed sub-query to each of the plurality of storage servers;
each of the storage servers being configured to: receive the formed sub-queries, scan the triples stored on the storage server for triples satisfying the result criteria of each of the received sub-queries, and, for each received sub-query, transfer a copy of any triple satisfying the result criteria of the sub-query to the other storage servers and/or the centralized database controller as a sub-query result of the sub-query, wherein the scanning comprises:
identifying each different triple pattern from among the received formed sub-queries;
prioritizing the identified different triple patterns with triple patterns having more variable value triple pattern elements being prioritized below triple patterns having fewer variable value triple pattern elements;
in order of priority, for each of the triple patterns, scanning the triples stored on the storage server for triples matching the triple pattern to obtain an intermediate result set of triples; and
obtaining sub-query results by combining the intermediate result set of triples for each of the triple patterns in sub-queries having more than one triple pattern, and by applying filtering conditions to the intermediate result set of triples for each of the triple patterns in sub-queries having filtering conditions:
the processor triples satisfying at least one formed sub-query as sub-query results from the plurality of storage servers and use the sub-query results to prepare query results as a response to the query.

11. A computer program which, when executed by one or more computing apparatuses, causes the one or more computing apparatuses to function as the database controller according to claim 10.

* * * * *